(12) United States Patent
Koenig et al.

(10) Patent No.: US 7,925,002 B2
(45) Date of Patent: Apr. 12, 2011

(54) ADMINISTERING MULTIPLE TARGET ACD SYSTEMS

(75) Inventors: Peter Koenig, Downers Grove, IL (US); Senthilvel Saravanan, San Jose, CA (US); Vyacheslav Mayorskiy, Chelmsford, MA (US)

(73) Assignee: Aspect Software, Inc., Chelmsford, MA (US)

( * ) Notice: Subject to any disclaimer, the term of this patent is extended or adjusted under 35 U.S.C. 154(b) by 838 days.

(21) Appl. No.: 11/977,589

(22) Filed: Oct. 25, 2007

(65) Prior Publication Data

US 2009/0110181 A1    Apr. 30, 2009

(51) Int. Cl.
*H04M 3/00* (2006.01)
*H04M 5/00* (2006.01)

(52) U.S. Cl. ............... 379/265.02; 379/265.05; 379/242

(58) Field of Classification Search ............ 379/265.02, 379/265.05, 242, 243, 265.11, 265.12, 265.13, 379/265.01
See application file for complete search history.

(56) References Cited

U.S. PATENT DOCUMENTS

| | | | |
|---|---|---|---|
| 5,546,455 A | 8/1996 | Joyce et al. | |
| 6,002,749 A | 12/1999 | Hansen et al. | |
| 6,324,547 B1 | 11/2001 | Lennert et al. | |
| 6,498,846 B1 | 12/2002 | Orui | |
| 6,690,786 B1 | 2/2004 | Kowal et al. | |
| 6,700,971 B1* | 3/2004 | Cohen et al. | 379/265.06 |
| 6,707,812 B1 | 3/2004 | Bowman-Amuah | |
| 6,868,152 B2 | 3/2005 | Statham et al. | |
| 7,684,989 B1* | 3/2010 | Collins et al. | 704/270.1 |
| 2002/0076030 A1 | 6/2002 | Statham et al. | |
| 2006/0098637 A1 | 5/2006 | Peltz et al. | |
| 2007/0206769 A1* | 9/2007 | O'Dell, III | 379/265.01 |

FOREIGN PATENT DOCUMENTS

| | | |
|---|---|---|
| EP | 0 948 218 A2 | 10/1999 |
| GB | 2 420 676 A | 5/2006 |
| SE | 519 639 C2 | 3/2003 |
| WO | WO95/06380 | 3/1995 |
| WO | WO/98/54884 | 12/1998 |
| WO | WO/02/35804 A2 | 5/2002 |
| WO | WO/2007/021329 A2 | 2/2007 |

OTHER PUBLICATIONS

European Search Report for related application EP 08 16 7377, Submitted on Feb. 16, 2009.

* cited by examiner

*Primary Examiner* — Thjuan K Addy
(74) *Attorney, Agent, or Firm* — Husch Blackwell LLP

(57) ABSTRACT

Method and system for administering multiple target systems automatic contact distribution (ACD) systems, where corresponding object types in the various target systems may have different schema. A user of the administering system works in a single schema, and translators permit communication between the administering system and the various target systems.

19 Claims, 2 Drawing Sheets

ADMINISTERING MULTIPLE TARGET ACD SYSTEMS

This invention pertains to administering multiple target automatic contact distribution (ACD) systems, particularly where the target systems have different schema and translators permit communication between the administering system and the target systems.

DETAILED DESCRIPTION OF SOME EMBODIMENTS

Figure 1:
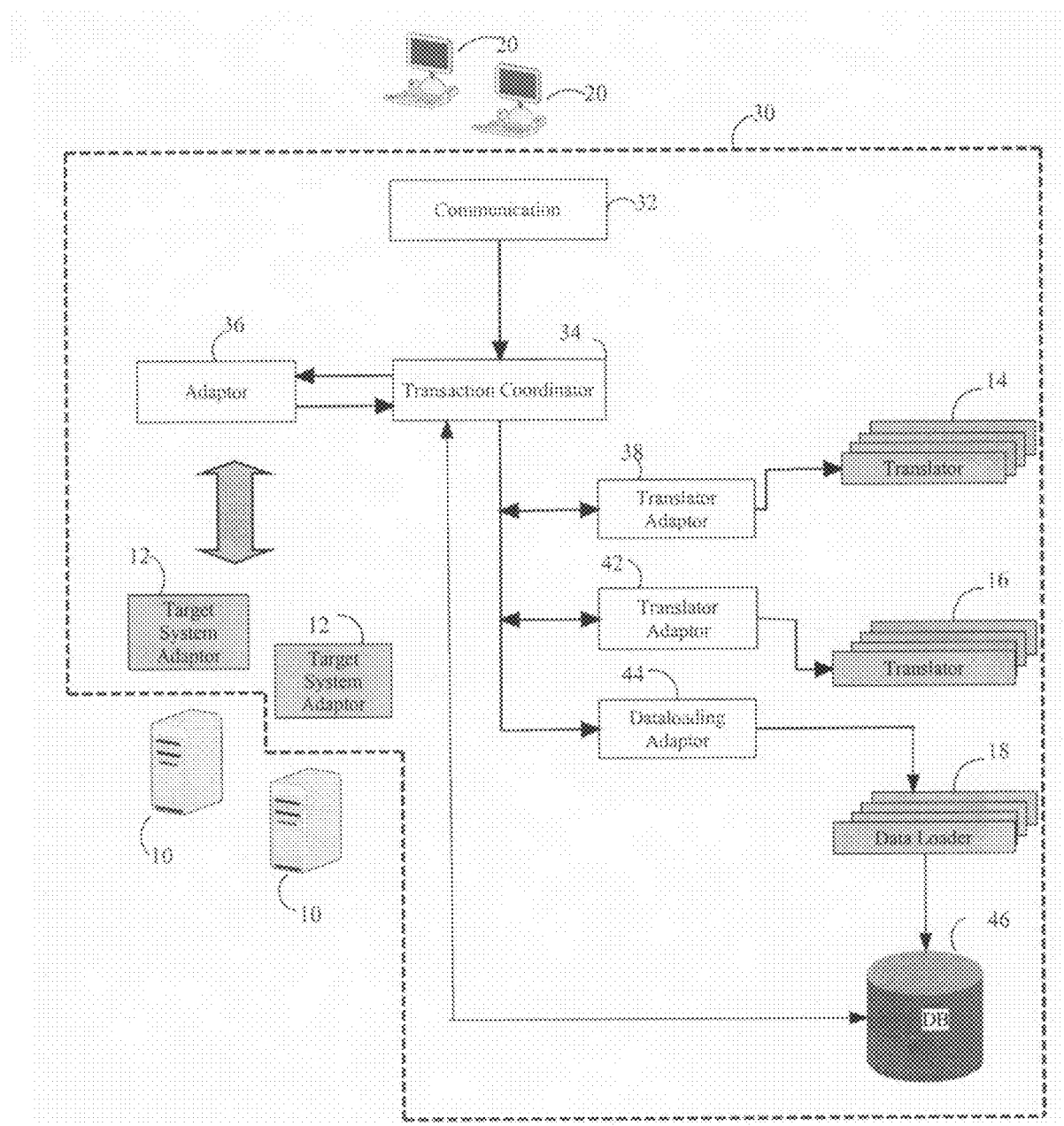
FIG. 1 is a simplified block diagram of an example of a system incorporating the invention.

While the present invention is susceptible of embodiment in various forms, there is shown in the drawings and will hereinafter be described some embodiments with the understanding that the present disclosure is to be considered an exemplification of the invention and is not intended to limit the invention to the specific embodiments illustrated or described.

Certain efficiencies can be achieved by centrally administering multiple "call centers" or ACD systems that, among other functions, distribute telephone calls or other contacts that are made to an organization. However, the various target ACD systems being centrally administered each can be different versions of a system or even can be entirely different systems. For example, a central system may be used to administer different versions of one commercially sold ACD system (such as a legacy Rockwell "Spectrum" ACD system, or a legacy Concerto "Unified IP" ACD system, or a legacy Aspect ACD system), or even to administer different commercially sold systems and different proprietary systems that were not commercially available.

In the example of FIG. 1, there are represented various target systems 10, and various user interfaces 20 for a user administering the target systems 10. The target systems 10 are not limited to ACD switches for distributing contacts among agents, but also may include ACD peripheral devices such as workforce management systems, dialer systems that generate outgoing calls, etc. Everything represented inside box 30 resides in a server of an administering system in the example of FIG. 1. The various user interfaces 20 and the various target systems 10 are in communication with the server of the administering system. A communication module 32 is used for marshalling communication between the administering system and the various user interfaces 20. There is a transaction coordinator 34, an adaptor 36 for the administering system and various target system adaptors 12 corresponding with respective target systems 10. There is a database 46, a dataloading adaptor 44, and a folder 18 of different data loaders for data from the different target systems.

For example, when the administering system restarts, it can request configuration data for each of the target systems 10 and can store that data in database 46. This corresponds with steps 52 and 54 in the example method illustrated in FIG. 2. For example, transaction coordinator 34, adaptor 36, and target system adaptors 12 may constitute means for requesting configuration data for each of the target systems 10, and transaction coordinator 34, dataloading adaptor 44, the data loaders in folder 18, and database 46 may constitute means for storing the configuration data. Similarly, data can be obtained and stored when a target system is added or changed. Depending on how the system is designed, steps 52 and 54 may involve obtaining and storing all of the configuration data for all of the target systems 10 or, alternatively, may involve only configuration data that has changed.

In administering the target systems 10, certain units of information hereinafter referred to as objects are often viewed, modified, or rearranged. Such objects may be grouped based on a number of object types that a user administering the target systems 10 might typically want to view or edit. Examples of such object types include agents, agent groups, agent super groups, trunk groups (i.e., collections of telephone lines), ANIs (i.e., caller numbers), DNISs (i.e., called numbers), supervisor teams, agent supervisors, announcements, categories of contact subject matter (e.g., billing, sales, maintenance support, etc.), classes of service (i.e., standard sets of permissions such as only in-calls, etc.), clients of administering system (e.g., outside observers monitoring statistics), system managers, and technicians. Different schemas may be used for storing and presenting corresponding object types in different target systems.

In a preferred embodiment, objects may be edited locally within any particular target system 10 and, indeed, any particular target system 10 is said to be the "master of its own data." In that embodiment, only data received from a target system 10 will be written to database 46 of the administering system. That will not necessarily be the case in other embodiments.

Returning to the example of FIG. 1, translator adaptors 38 and 42 access appropriate translators from folders 14 and 16, respectively. Using data definition and categorization, the translators convert objects in the administering system to the correct schema for delivery to and from a target system. For example, each of the different translators in folder 14 may translate between the schema of the administering system and the schema of a different commercial or proprietary ACD system, and each of the different translators in folder 16 may translate between the schema of the administering system and the schema of a different version of a particular ACD system. In some cases, two translators can be used to convert an object to the correct schema, in order to convert to the correct commercial system and to the correct version of that commercial system. There can be other translators and adaptors, and there can be other block diagram representations of them.

A user administering the target systems 10 can be communicating with the administering system through a user interface 20. In step 62 of the example of FIG. 2, there is browsing of a collection of objects within a particular object type. For example, communication module 32, transaction coordinator 34 and database 46 may constitute means for providing the collection of objects and for providing a particular object that the user desires to edit. That collection of objects is being retrieved from database 46 and represents information for multiple target systems 10, but a particular object typically represents information associated with a particular target system 10. In step 64, there is selection and editing of a particular object.

Figure 2:
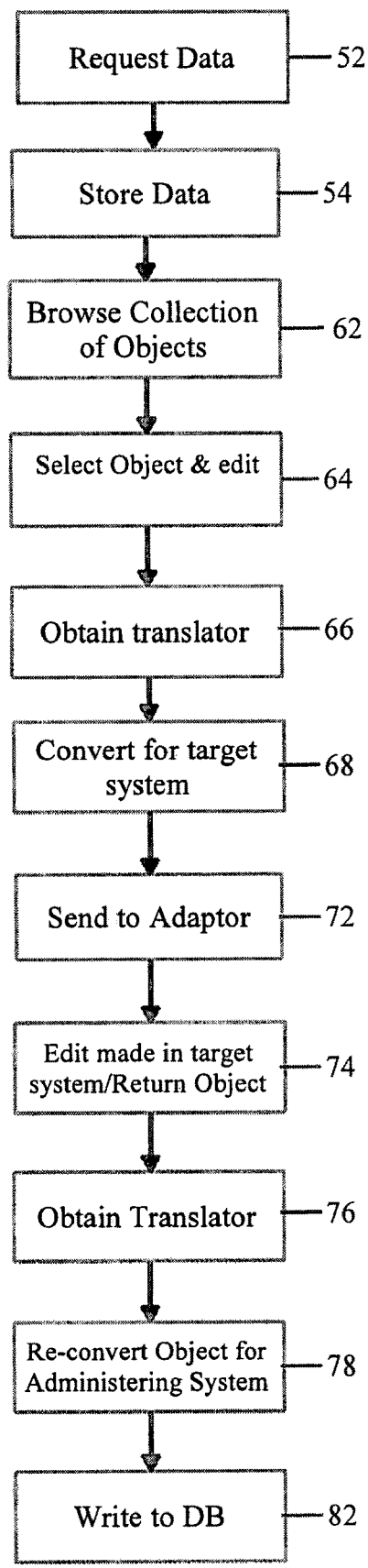
FIG. 2 is a simplified flow chart of an example of a method incorporating the invention.

Continuing with the example of FIG. 2, assume that a user has initiated a command to save an edit at a user interface 20. In step 66, transaction coordinator 34 may request translator adaptor 42, for example, to obtain an appropriate translator from folder 16. In step 68, that translator converts the edited object for use in a particular intended target system 10. The intended target system 10 may not be the same target system 10 with which the object was associated when it was selected and before it was edited. In step 72, the converted object is sent to the appropriate target system adaptor 12 corresponding with the intended target system 10. In step 74, the edit is made in the intended target system 10, and the object is returned to the administering system. In step 76, transaction coordinator 34 again may request translator adaptor 42, for example, to obtain an appropriate translator from folder 16. In step 78, the translator re-converts the returned object to one for the administering system. In step 82, the re-converted object is written to database 46, and the edit can be viewed at a user interface 20.

For example, transaction coordinator 34 and translator adaptor 42 may constitute means for obtaining a translator designed to translate between the schema of the administering system and the schema of the intended target system 10. A translator in folder 16 may constitute means for converting the edited object for use in the intended target system 10, and means for re-converting an object received from the intended target system 10 for use in the administering system. Transaction coordinator 34, adaptor 36 and an appropriate target system adaptor 12 may constitute means for providing the converted object for making the edit in the intended target system 10, and means for receiving the converted object back from the intended target system 10. Transaction coordinator 34 and database 46 may constitute means writing a re-converted object to the database 46.

A user may view an object representing information obtained from a particular target system 10, edit the object, and save it to the same or to a different target system 10. The user interacts only with the schema of the administering system, and the translation to and from the schema for the different target systems 10 occurs seamlessly.

Only folders 14, 16 and 18 and target system adaptors 12 include modules that are specific to particular target systems 10. The other components of the administering system function generically. For example, a translator might be added or substituted in folder 16 to accommodate a new or modified target system 10 without a need to change any code in the rest of the administering system (except the database 46 also may require some modification to accommodate data derived from new target systems 10). For example, translator adaptor 42 may scan folder 16 for the applicable translator, so a new translator is dynamically obtained on demand during runtime.

For a given object type, the schema for the administering system can include the properties present in each of the schemas of the different target systems 10. There also can be target system identifiers and metadata indicating the properties available in a given target system 10 for the given object type. Using this additional information, the properties actually displayed for a user at a user interface 20 can be limited to conform with the properties available in the schema of the intended target system 10. For example, this above-mentioned metadata as stored in database 46 and conveyed by transaction coordinator 34 and communication module 32 may constitute means for limiting the properties of an object that will be displayed when a user desire to edit the object.

For example, if an intended target system 10 cannot accommodate a particular property for a given object type, the field for that property can be hidden when a user is editing an object of that object type for that intended target system 10. When the user initiates a command to save the edit, an appropriate translator (such as from folder 16) will use the fields from the edited object to populate an object in accordance with the schema of the intended target system 10.

Therefore, the richness of detail added in one target system 10 is not lost, as would be the case if the schema of the administering system were limited to those properties available in all of the different target systems 10.

Assuming, as an example, that a user views a collection of agents from multiple target systems 10, and that the schema of a first target system 10 does not include the property of agent nicknames but that the schema of a second target system 10 does include that property. If the intended target system 10 is the first one, then a nickname field will not appear on the user interface 20 when the user is editing an agent object. However, a nickname field will appear if the intended target system 10 is the second one. In either case, the user interacts only with the schema of the administering system, and an appropriate translator (such as from folder 16) will use the fields from the edited object to populate an agent object in accordance with the schema of the intended target system 10.

From the foregoing, it will be observed that numerous modifications and variations can be effectuated without departing from the true spirit and scope of the novel concepts of the present invention. It is to be understood that no limitation with respect to the specific embodiments illustrated or described is intended or should be inferred.

What is claimed is:

1. A method of administering multiple target automatic contact distribution (ACD) systems, where all of the target systems do not use the same schema to represent a particular object, and where the target systems can comprise ACD switches and can comprise ACD peripheral devices, the method comprising:
   providing the particular object for making a desired edit to the particular object;
   obtaining a translator designed to translate between a schema of an administering system and a schema of an intended one of the target systems;
   using the translator to convert the edited object for use in the intended one of the target systems;
   providing the converted object for making the edit in the intended one of the target systems;
   wherein the intended one of the target systems may be, but is not necessarily, a target system with which the particular object was associated when it first was provided for making the desired edit.

2. The method as in claim 1, further comprising:
   providing indicators for limiting properties, of the particular object, being displayed when the particular object is first provided for making the desired edit;
   wherein the properties being displayed can be limited to conform with properties of the particular object that are available in the schema of the intended one of the target systems.

3. The method as in claim 1, further comprising:
   receiving the converted object from the intended target system;
   using the translator to re-convert the received object for use in the administering system;
   writing the re-converted object to a database of the administering system.

4. The method as in claim 1, further comprising:
   requesting configuration data for each of the target systems;
   storing the configuration data in a database of the administering system.

5. The method as in claim 1, further comprising:
   providing a collection of objects for selecting one object of the collection;
   the collection comprising the particular object.

6. The method as in claim 1, the particular object being of a particular object type, the object type being selected from a group consisting of agents, agent groups, agent super groups, trunk groups, caller numbers, called numbers, supervisor teams, agent supervisors, announcements, categories of contact subject matter, classes of service, clients of the administering system, system managers, and technicians.

7. A unified system for administering multiple target automatic contact distribution (ACD) systems, where all of the target systems do not use the same schema to represent a particular object, and where the target systems can comprise ACD switches and can comprise ACD peripheral devices, the administering system comprising:
- a database for storing information associated with different ones of the target systems, respectively;
- a transaction coordinator for coordinating communication of objects between the database, the different ones of the target systems, and a user interface for a user of the administering system;
- at least one folder of translators, where a respective translator of the at least one folder is designed to translate between a schema of the administering system and a schema of a respective one of the target systems;
- wherein a new translator can be added to the at least one folder without restarting the administering system, without changing code for operation of the transaction coordinator, and without changing code for communication with the user interface;
- wherein the new translator can be dynamically obtained on demand during runtime.

8. The system as in claim 7, further comprising:
- at least one translator adaptor for accessing an appropriate one of the translators from the at least one folder of data loaders.

9. The system as in claim 7, further comprising:
- a plurality of target system adaptors;
- communication between the administering system and a particular one of the target systems being conducted through one of the target system adaptors that corresponds with the particular one of the target systems.

10. The system as in claim 7, wherein, for a particular object type, the schema of the administering system includes properties present in each of the schemas of the target systems.

11. The system as in claim 7, further comprising:
- the schema of the administering system including a target system identifier property for the particular object;
- metadata associated with the particular object;
- wherein the metadata can be used to indicate properties available in a particular target system for the particular object.

12. The system as in claim 7, further comprising a communication module for marshalling communication between the administering system and the user interface.

13. The system as in claim 7, further comprising:
- a folder of data loaders, where respective data loaders of the folder of data loaders are designed to facilitate writing configuration data for respective ones of the target systems to the database;
- a dataloading adaptor for accessing an appropriate one of the data loaders from the folder of data loaders.

14. A unified system for administering multiple target automatic contact distribution (ACD) systems, where all of the target systems do not use the same schema to represent a particular object, and where the target systems can comprise ACD switches and can comprise ACD peripheral devices, the system comprising:
- means for providing the particular object for making a desired edit to the particular object;
- means for obtaining a translator designed to translate between a schema of an administering system and a schema of an intended one of the target systems;
- means for converting the edited object for use in the intended one of the target systems;
- means for providing the converted object for making the edit in the intended one of the target systems;
- wherein the intended one of the target systems may be, but is not necessarily, a target system with which the particular object was associated when it first was provided for making the desired edit.

15. The system as in claim 14, further comprising:
- means for limiting properties, of the particular object, being displayed when the particular object is first provided for making the desired edit;
- wherein the properties being displayed can be limited to conform with properties of the particular object that are available in the schema of the intended one of the target systems.

16. The system as in claim 14, further comprising:
- means for receiving the converted object from the intended target system;
- means for re-converting the received object for use in the administering system;
- means for writing the re-converted object to a database of the administering system.

17. The system as in claim 14, further comprising:
- means for requesting configuration data for each of the target systems;
- means for storing the configuration data in a database of the administering system.

18. The system as in claim 14, further comprising:
- means for providing a collection of objects for selecting one object of the collection;
- the collection comprising the particular object.

19. The system as in claim 14, the particular object being of a particular object type, the object type being selected from a group consisting of agents, agent groups, agent super groups, trunk groups, caller numbers, called numbers, supervisor teams, agent supervisors, announcements, categories of contact subject matter, classes of service, clients of the administering system, system managers, and technicians.

* * * * *